United States Patent [19]

Janakirama-Rao

[11] 3,779,733

[45] Dec. 18, 1973

[54] METHOD OF MANUFACTURING HEAT ABSORBING GLASS

[75] Inventor: Bhogaraju V. Janakirama-Rao, Aspinwall, Pa.

[73] Assignee: PPG Industries, Inc., Pittsburgh, Pa.

[22] Filed: Nov. 30, 1971

[21] Appl. No.: 203,404

Related U.S. Application Data

[63] Continuation-in-part of Ser. No. 5,796, Jan. 26, 1970, Pat. No. 3,652,303.

[52] U.S. Cl. .......................... 65/32, 65/134, 65/30, 106/54
[51] Int. Cl. .............. C03b , C03b 5/16, C03b 3/04
[58] Field of Search .................. 65/32, 134; 106/52, 106/54

[56] References Cited
UNITED STATES PATENTS

| | | | |
|---|---|---|---|
| 2,505,001 | 4/1950 | Nordberg | 65/32 X |
| 2,612,727 | 10/1952 | Nordberg | 65/32 |
| 3,278,319 | 10/1966 | Cohen | 65/32 X |
| 3,307,929 | 3/1967 | Trap | 65/32 |
| 2,469,490 | 3/1949 | Armistead | 65/134 X |
| 3,345,190 | 10/1967 | Albinak et al. | 65/32 X |
| 3,231,456 | 1/1966 | McMillan et al. | 65/32 X |
| 3,438,760 | 4/1969 | Loukes et al. | 65/32 X |
| 3,524,738 | 8/1970 | Grubb et al. | 65/134 |
| 3,649,311 | 3/1972 | Arauju | 106/54 |

Primary Examiner—Frank W. Miga
Attorney—Russell A. Eberly

[57] ABSTRACT

An improved method of making a ferrous ion-containing, heat absorbing glass article is disclosed. The improvement resides in incorporating iron and tin in the glass, and establishing and maintaining during the glass melting, refining and forming period at least 80 percent of the iron in the glass in the ferrous state. Further, sufficient tin is maintained in the stannous state to act as an internal reducing agent to prevent oxidation of the ferrous ion to the ferric species in a subsequent glass reheating step.

15 Claims, 1 Drawing Figure

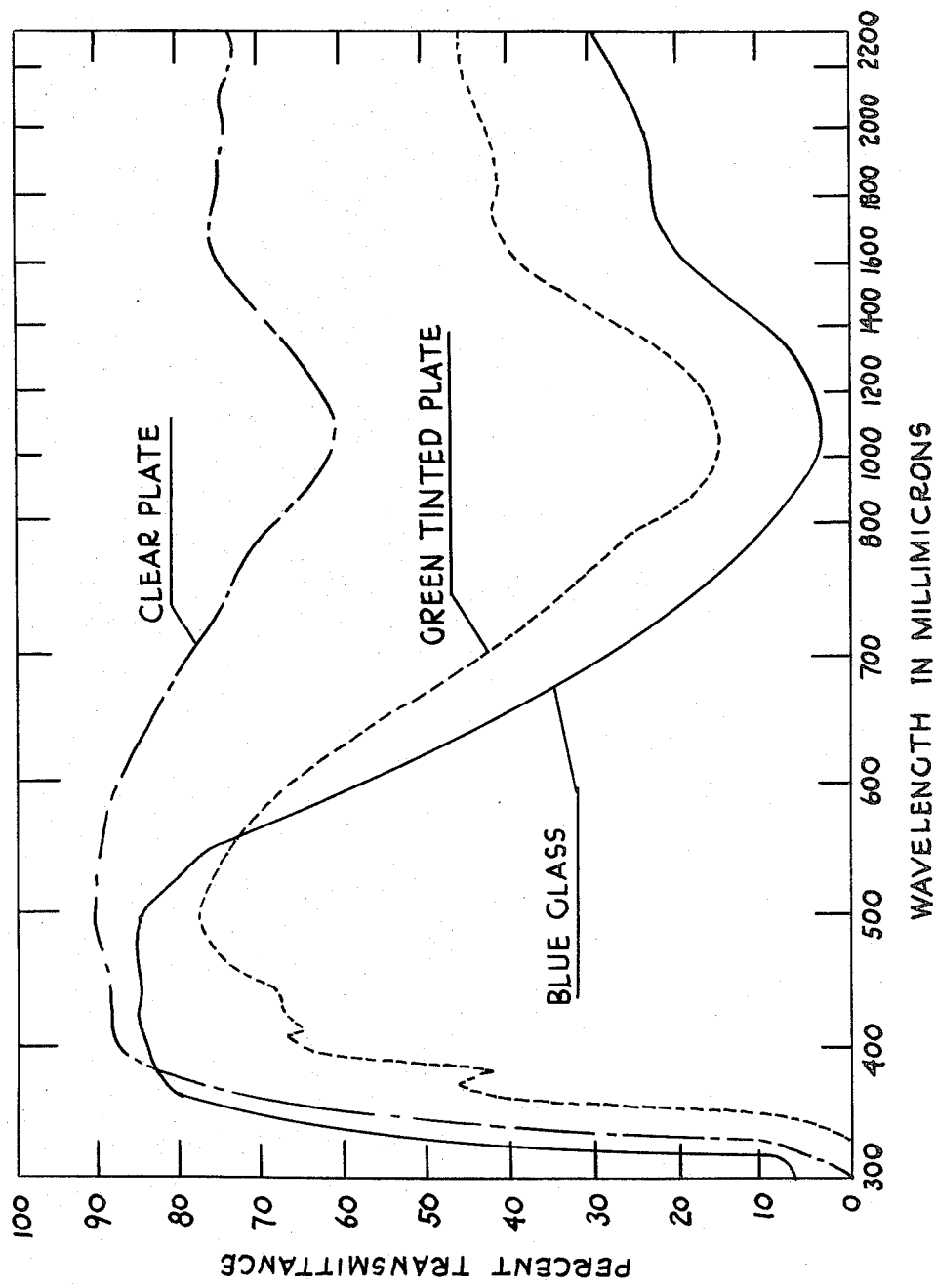

METHOD OF MANUFACTURING HEAT ABSORBING GLASS

CROSS REFERENCE TO RELATED APPLICATIONS

This application is a continuation-in-part of my co-pending application Ser. No. 5,796, filed Jan. 26, 1970, now U. S. Pat. No. 3,652,303, issued Mar. 28, 1972.

BACKGROUND OF THE INVENTION

1. Field of the Invention

This invention is in the field of heat absorbing glasses. More particularly, this invention is in the field of high visible light transmitting and high infrared radiation absorbing glasses containing ferrous ions, which glasses are suitable for automobile and architectural applications.

2. Description of the Prior Art

In the manufacture of heat absorbing automotive and architectural glasses, iron, usually in the form of ferric oxide ($Fe_2O_3$), is added to the glass composition. The iron in glass under ordinary conditions of melting in air is in two states, the ferrous state ($Fe^{+2}$) and ferric state ($Fe^{+3}$) with an equilibrium established according to the equation:

$$Fe^{+2} \rightleftarrows Fe^{+3} + 1e^-$$

In glass melted at 2,600–2,900°F. in air, this equilibrium is found to be in the range of 40 to 60 weight percent $Fe^{+2}$ with respect to the total iron. It is well established in the art, see for example, U.S. Pat. No. 3,326,703, that it is the presence of the ferrous species which gives rise to heat absorption. Ferrous ion absorbs infrared radiation because it has an absorption band in the near infrared region of the spectrum, around 1,100 millimicrons wavelength. The magnitude of the infrared absorption band of the ferrous ion at its maximum around 1,100 millimicrons is a function of the concentration of the ferrous ion. Therefore, the greater the ferrous ion concentration, the greater the amount of heat the glass will absorb. However, ferrous ion gives the glass a blue color in the visible regions of the spectrum and cuts down on visible light transmission and limits its permissible concentration in glass. For automobile applications, an infrared radiation absorbing glass has to transmit greater than 70 percent visible light at a ¼-inch thickness. Thus, a dilemma is created in that it is desirable to have high ferrous ion concentrations to absorb a high percentage of the incoming infrared radiation, yet the ferrous and ferric ion concentration must not be so great that the visible light transmission is too greatly reduced.

This dilemma is solved by the improved method of this invention. The invention provides for the incorporation of a relatively small amount of iron in the glass, thus insuring a high visible light transmission. Besides, at least 80 percent of the iron is converted to the ferrous state, thereby providing a high infrared absorbing glass. The iron is maintained in the ferrous state by adding to the glass composition a tin compound. Sufficient tin is maintained in its stannous state in the resultant glass to serve as an internal reducing agent in the glass and prevent any tendency towards conversion of the ferrous ion to the ferric species arising from oxidizing influences, such as oxygen diffusion from air into the glass when the glass is reheated during a subsequent fabrication step, as for example, press bending or thermal tempering.

SUMMARY OF THE INVENTION

In accordance with this invention, there is provided an improved method of making a ferrous ion-containing, heat absorbing glass article, which includes the steps of mixing, melting, refining, forming and fabricating glass, and which method includes, during the fabrication step, a subsequent reheating of the formed glass, the improvement comprising:

a. incorporating iron and tin in the glass, and
b. establishing and maintaining in the glass prior to reheating
   i. at least 80 percent by weight of the iron in the ferrous state, and
   ii. sufficient tin in the stannous state to prevent oxidation of the ferrous ion in the subsequent reheating of the formed glass.

BRIEF DESCRIPTION OF THE DRAWING

The drawing shows the spectral transmittance curves between wavelengths of 300 and 2,000 millimicrons of three ¼-inch thick samples of glass. The glass samples are clear plate glass, green-tinted plate glass and blue-tinted plate glass, which has been prepared by the improved method of this invention.

DETAILED DESCRIPTION

As has been mentioned above, the invention is directed to an improvement in a method of making a ferrous ion-containing heat absorbing glass article.

In the making of glass articles, the various ingredients which go into the glass are first batch mixed and handled in a dry or wet state. The glass batch in powder, pellet or wet mix form is charged to a furnace where the ingredients are melted and reacted with one another. The temperature of the glass in the melting furnace is about 2,600–2,900°F. During the melting and reacting, gases are being continuously evolved, and sometimes they become entrapped within the glass melt. To remove these pockets of gas, the glass melt is passed to a lower temperature section of the tank, the so-called refining section, where the glass is refined at a temperature of about 2,400°F. The refining operation makes the glass clear, bubble-free and homogeneous. Following the melting and fining, the glass is flowed from the refining portion of the tank and formed into flat glass. The forming operation consists of taking the hot, viscous liquid glass, which is at a temperature now of about 1,500–2,000°F. and shaping it by pressing, drawing, rolling or floating the glass into flat sheet form.

Immediately after being formed, the glass is conveyed to a long oven, called a lehr, in which the flat glass is annealed. After annealing, the glass is cooled to room temperature. The glass can then be reheated in a subsequent fabrication step to make a resultant glass article. For example, when the glass is to be press bent into a curved motor vehicle closure, the glass is usually reheated to a temperature of about 1,100–1,200°F. prior to bending. As another example, if the glass is to be thermally tempered, it must first be heated to a temperature somewhere near its strain point; for soda-lime-silica glass, this is about 1,400°F.

It is in these subsequent reheating steps, after forming, that oxidative influences are greatest. The oxidative influences are believed to be due to the diffusion of oxygen from the air into the glass during the reheating. In manufacturing a heat absorbing glass containing ferrous ion, these oxidizing influences may convert a significant portion of the ferrous ion to the ferric species, which reduces the heat absorbing capacity of the glass. The improved process of the invention overcomes this problem and provides for establishing and maintaining throughout the glass melting, refining and forming period at least 80 percent of the iron in the ferrous state and sufficient tin in the stannous state to prevent oxidation of the ferrous ion to the ferric species in a subsequent reheating of the formed glass article.

The invention can be accomplished by adding iron and tin to the glass batch as metallic iron and metallic tin. The metallic iron and tin together counteract the oxidizing influences of the refining agents (for example, sodium chloride, sodium nitrate and arsenious oxide) used in the glass composition and, in the process, are converted themselves to ferrous and stannous ions, respectively. The presence of stannous ion in the glass serves as an internal reducing agent and prevents subsequent oxidation of the ferrous ion to the ferric species in a subsequent fabrication step where the glass has to be reheated. Any tendency towards conversion of the ferrous ion to the ferric species arising from oxidizing influences is efficiently prevented by the presence of stannous ion which pushes the equilibrium between the ferric and the ferrous ions towards the ferrous state, as is shown in the equation below:

$$2 Fe^{+3} + Sn^{+2} \rightarrow 2 Fe^{+2} + Sn^{+4}$$

This is so because the stannous ion is a more powerful reducing agent than the ferrous ion.

Besides the iron and tin being added to the glass batch in their fully reduced, metallic states ($Fe^0$ and $Sn^0$, respectively), they may be added to the glass batch in their higher oxidative states. The iron may be added in its ferrous state ($Fe^{+2}$) and even in the ferric ($Fe^{+3}$) state. Examples would include the addition of iron in the form of ferrous oxide or ferrous oxalate and as ferric oxide. The tin may be added in the stannous ($Sn^{+2}$) and stannic ($Sn^{+4}$) states as stannous chloride and stannic chloride, respectively. If the iron and tin are added in their higher oxidation states, certain precautions must be taken to insure that at least 80 percent of the iron is converted and is maintained throughout the manufacturing period in the ferrous state, and sufficient tin is present in the glass composition in the stannous state to prevent oxidation of the ferrous ion in a subsequent reheating step. Such precautions would include, for example, using a reducing atmosphere in the melting and fining steps of a glass manufacturing process. The use of a reducing atmosphere will convert the iron present in the ferric state to the ferrous state. The reducing atmosphere can be attained, for example, by bubbling hydrogen or natural gas through the glass melt. Alternately, a constituent could be added to the glass composition which, during the melting and refining operations, would decompose, releasing hydrogen. Such a constituent would be, for example, ammonium chloride or oxalic acid, which decompose at the glass melting temperature and release hydrogen gas.

With regards to the amount of iron and tin which are to be incorporated in the glass composition in practicing the improved method of this invention, the amounts incorporated should, of course, be sufficient to provide a ferrous ion content measured as FeO in the resultant glass composition of between 0.05 and 2.60 percent by weight based on total weight of the glass composition, and a stannous ion content measured as SnO of between 0.10 and 5.70 percent by weight based on total weight of the glass composition. There should be sufficient tin maintained in the stannous state to act as an internal reducing agent to prevent oxidation of the ferrous ion to the ferric species when the glass is reheated in a subsequent reheating step to fabricate a glass article. For this purpose, the mole ratio of stannous ion to ferrous ion before the reheating step should be at least 1:1. The proportion of FeO can be measured by spectrophotometric analysis. If the amount of FeO in the glass composition is less than 0.05 percent by weight, the heat absorption of the glass is lower than desired. If the FeO content in the glass composition is present in excess of 2.60 percent by weight, visible light transmission is unsatisfactorily low. If the amount of SnO in the glass composition is less than 0.1 percent by weight, then there will be insufficient stannous ion present in the glass to prevent subsequent oxidation of the ferrous ion in a reheating step after forming of the glass.

In general, it has been found that the above results with regards to the percentages of FeO and SnO can be achieved if from about 0.05 to 2 percent by weight iron measured as $Fe^0$ and 0.1 to 5 percent by weight of tin measured as $Sn^0$ are added to the glass batch. Percentages by weight are based on the total weight of the glass batch. If greater amounts of iron are added than those specified, the glass will have an undesirably low visible light transmittance. If lower amounts of iron are used than that recommended, the glass will not have the high infrared absorption properties. If too much tin is added, that is, greater than 5 percent by weight, then the working temperature range of the glass will be undesirably narrow, such that the improved method of the invention cannot be used with the currently employed commercial processes for making flat glass. If less than the required amount of tin is used, that is, less than 0.1 percent by weight, then there will be insufficient stannous ion present in the glass to prevent subsequent oxidation of the ferrous ion in a subsequent reheating step.

Examples of the various commercial glass manufacturing processes which can employ the improvement of this invention are the float process for making float glass, as described in U.S. Pat. No. 3,083,551; the Pittsburgh Process, also known as the PENNVERNON Process (registered trademark of PPG Industries, Inc.) to make sheet glass, such process being described in U.S. Pats. Nos. 1,833,379, 1,833,380, 1,833,381 and 1,833,382; and the Continuous Plate Process for making plate glass, as described in U.S. Pats. Nos. 2,478,090 and 2,505,103. Suitable glass compositions which can be used in the practice of this invention are as follows:

| Components | Weight % Based on Total Component Weights as Determined by Wet Chemical Analysis | |
| --- | --- | --- |
| | Permissive Range | Preferred Range |
| $SiO_2$ | 60–80 | 68–74 |
| $Na_2O$ | 10–20 | 11–14 |
| $K_2O$ | 0–10 | 0–1 |
| $Na_2O + K_2O$ | 10–21 | 11–15 |
| CaO | 5–16 | 6–13 |
| MgO | 0–10 | 1.5–4 |
| CaO + MgO | 5–20 | 10–15 |
| $Al_2O_3$ | 0–5 | 1–3.5 |
| $Fe_2O_3$* | 0.1–5.8 | 0.20–5.5 |
| $SnO_2$ | 0–1.27 | 0–1.2 |

| | | |
|---|---|---|
| SnO | 0.1–5.00 | 0.1–5.00 |
| Cl⁻ | 0.1–2 | 0.1–1.5 |

* Total iron in the glass composition measured by wet chemical analysis as $Fe_2O_3$.

| Components | Weight % Based on Total Component Weight as Determined by Absorption Spectrophotometric Analysis | |
|---|---|---|
| | Permissive Range | Preferred Range |
| $Fe_2O_3$ | 0–1.14 | 0–1.10 |
| FeO | 0.06–2.57 | 0.06–2.57 |

The glass former is $SiO_2$. Sodium oxide is present as a flux to reduce the melting temperature of the glass. Potassium oxide may be employed in place of a portion of the $Na_2O$, but the use of $Na_2O$ is preferred because it is less expensive. The total amount of alkali metal oxide in the glass should range from 10 to 21 percent by weight. CaO and MgO are also employed as fluxes. They are used to supplement the $Na_2O$ because they improve the chemical durability of the glass. The amount of alkaline earth metal oxides in the glass can range from 5 to 20 percent by weight. Alumina may be present in the glass in varying amounts, depending mainly on the manner in which the glass is formed. Alumina is employed to regulate the viscosity of the glass, improve its durability and prevent devitrification of the glass. Relatively small amounts of alumina, for example, less than 1.0 percent by weight, are employed when plate glass is cast from a pot or made in a tank and formed by rolling it horizontally between sizing rolls. However, when the glass is formed by drawing it vertically from the kiln of a tank over a draw bar and upwardly between rollers (sheet glass), up to 5 percent by weight alumina can be employed. Usually, however, from 1.0 to 3.5 percent by weight alumina is employed when forming glass by the sheet or vertical drawing procedure. Trace amounts of $TiO_2$ are frequently present, e.g., in the amounts of up to 0.05 percent by weight, as an impurity.

The glass articles prepared by the improved method of this invention can be produced from conventional glass making materials properly compounded and thoroughly mixed so as to yield, when reacted, glasses of the desired composition. Suitable batch materials include sand, soda ash, potassium carbonate, limestone, dolomite, aluminum hydrate, aplite, feldspar, rouge, ferrous oxide, stannous oxide, metallic iron and metallic tin. Refining agents, such as salt cake, sodium nitrate, sodium chloride, antimony oxide, arsenious oxide and combinations thereof, may be present in the batch provided certain precautions are taken. The refining agents are strong oxidizers and when they are used, care should be taken that a reducing atmosphere is maintained in the melting and refining stages of the manufacturing process. Also, if refining agents are used, the iron and tin should be added in their reduced forms as metallic iron and metallic tin.

The glass compositions manufactured in the improved process of the invention have viscosity versus temperature characteristics suitable for drawing into flat glass by modern plate, sheet and float glass production methods.

Also, the glass articles manufactured according to the improved process of this invention have high visible light transmittance and low infrared radiation transmittance. Accordingly, the visible light transmittance (i.e., between wavelengths of 350 to 500 millimicrons) is greater than 70 percent at ¼-inch thickness, and the infrared radiation (i.e., between wavelengths of 950 and 2,000 millimicrons) transmittance is less than 15 percent at ¼-inch thickness. In addition, the glass of this invention has the total solar energy transmittance of less than 50 percent at ¼-inch thickness, which complies with Federal Specification No. D-G-451-A for automotive heat absorbing windshields.

EXAMPLES

The following examples depict the improved method of this invention. In the various examples, iron and tin are added to the glass compositions in differently respective oxidation states. In each example, however, the method of manufacture converts at least 80 percent of the iron to the ferrous state to give a pale, blue-colored glass with high visible light transmittance and high infrared radiation absorption. Also, sufficient tin is maintained in the stannous state to prevent oxidation of the ferrous ion to the ferric species.

Example I

This example shows the addition of iron and tin to the glass composition in their respective metallic states.

| Batch Ingredients | Parts by Weight (in grams) |
|---|---|
| Sand | 710 |
| Sodium carbonate | 205 |
| Calcium carbonate | 152 |
| Magnesium carbonate | 80 |
| $Al(OH)_3$ | 3 |
| Tin metal, 200 mesh | 20 |
| Iron metal, 200 mesh | 3.5 |
| Sodium sulfate | 35 |
| Sodium chloride | 10 |
| Oxalic acid | 5 |

A laboratory pot-glass batch is prepared by thoroughly mixing the above batch ingredients to give a 1,223.5 gram batch. This batch yields approximately 1,000 grams of glass after melting and fining which is conducted as follows.

An empty refractory clay pot is heated in a gas-fired furnace at a furnace temperature of about 2,900°F. A portion (approximately one-third) of the mixed batch is ladled into the preheated pot at the furnace temperature of about 2,700°F. The remaining portion of the mixed batch is ladled into the pot over a period of 2 hours, and the temperature is raised gradually to about 2,900°F. during this time. The temperature is maintained at 2,900°F. for the next 4 hours to refine the glass. At the end of this time, the chemical reactions are completed; the glass is free of bubbles and is substantially homogeneous.

After the glass is refined, the temperature of the furnace is reduced to 2,700°F. over a period of 1 hour. The furnace is then held at this temperature for 1 hour. The pot is removed from the furnace, and the glass is poured on a metal table and rolled in the form of a plate. The plate is placed in a kiln and cooled from 1,200°F. to room temperature. The glass is subsequently cut into pieces suitable for grinding, polishing and testing. The calculated composition of the above-given batches is as follows:

| Component | Wet Chemical Analysis Percent by Weight Based on Total Component Weight |
|---|---|
| $SiO_2$ | 71.0 |
| $Na_2O$ | 13.5 |
| CaO | 8.5 |
| MgO | 3.8 |
| $Al_2O_3$ | 0.2 |
| $SnO_2$* | 2.5 |
| $Fe_2O_3$* | 0.5 |

| | |
|---|---|
| $SO_3^{-2}$ | 0.2 |
| $Cl^-$ | 0.1 |

* Total iron and tin in the glass composition measured by wet chemical analysis as $Fe_2O_3$ and $SnO_2$, respectively.

Absorption Spectrometric Analysis

| Component | Percent by Weight |
|---|---|
| $Fe_2O_3$ | 0.01 |
| FeO | 0.21 |

A ¼-inch thick polished plate sample of glass made by the above pot method, when subjected to optical and spectral transmittance, yielded the following values:

| Property | Percent |
|---|---|
| Luminous Transmittance | 74 |
| Total Solar Infrared Transmittance | 10 |
| Total Solar Energy Transmittance | 39 |

Examples II – V

The following examples depict, on a commercial scale, the improved method of the invention. In the examples, iron is added to the glass batch in the form of ferric oxide, and tin is added to the glass batch in the form of stannous chloride. Also, ammonium chloride and oxalic acid are included in the glass batch to give a reducing condition internally, since they decompose in the glass melt to release hydrogen. In the method depicted by these examples, greater than 80 percent of the iron is converted to the ferrous state, and sufficient tin is maintained in the stannous state to prevent further oxidation of the ferrous ion.

A 3,600-pound glass batch was prepared by thoroughly mixing the various ingredients listed below:

| Batch Ingredients | Parts by Weight |
|---|---|
| Sand | 730 |
| Soda ash | 235 |
| Limestone | 57.4 |
| Dolomite | 91 |
| $Al(OH)_3$ | 18 |
| $SnCl_2 \cdot 2H_2O$ | 50 |
| Ferric oxide | 2.5 |
| Oxalic acid | 8 |
| Ammonium chloride | 12 |

In the above batch, metallic iron powder can be substituted for ferric oxide and/or metallic tin could be substituted for $SnCl_2 \cdot 2H_2O$. As an added means of attaining reducing conditions, hydrogen gas or natural gas could be bubbled through the molten glass.

In melting the above batch, a refractory pot is preheated to 2,600°F. in a gas-fired furnace. The above batch is added over a 10-hour period in five intervals. The temperature is then raised to 2,700°F., and the glass is stirred at this temperature for 10 hours. The stirrer is removed, and the glass is refined 5 hours at 2,600°F. to remove the entrapped bubbles of gas. The furnace temperature is then dropped to 2,300°F., and the glass is held at this temperature for 6 hours before casting. The glass melt is then cooled to the casting temperature of 2,100°F. Finally, the glass which is now free of bubbles is ready to be cast. The glass is cast onto a sheet rolling machine and rolled in the form of a plate. The plate is conveyed into a lehr and cooled from 1,200°F. to 200°F. Thereafter the glass is cooled more rapidly to room temperature and subsequently cut into pieces suitable for grinding, polishing and testing. The above commercial pot batch yields approximately 3,000 pounds of glass after melting and refining, which amounts to 700 square feet of plate glass at 5/16-inch thickness.

The composition of the above-given batch is as follows:

| Component | Wet Chemical Analysis Percent by Weight Based on Total Component Weight | Calculated Percent by Weight Based on Total Component Weight |
|---|---|---|
| $SiO_2$ | 70.18 | 70 |
| $Na_2O$ | 12.46 | 12.5 |
| CaO | 8.26 | 8.5 |
| MgO | 3.16 | 3.3 |
| $Al_2O_3$ | 1.40 | 1.25 |
| $SnO_2$* | 3.36 | 3.0 |
| $Fe_2O_3$* | 0.26 | 0.25 |
| $Cl^-$ | 0.92 | 1.20 |

* Total iron and tin in the glass composition measured by wet chemical analysis as $Fe_2O_3$ and $SnO_2$, respectively.

Absorption Spectrophotometric Analysis

| Component | Percent by Weight |
|---|---|
| $Fe_2O_3$ | 0.027 |
| FeO | 0.206 |

A ¼-inch thick polished plate sample of glass made by the pot method, when subjected to optical and spectral transmittance measurements, yields the following values:

| Property | Percent |
|---|---|
| Visible Light Transmittance as Measured by Luminous Transmittance | 74.1 |
| Total Solar Infrared Transmittance | 10.9 |
| Total Solar Energy Transmittance | 39.8 |

The transmittance characteristics of the above are shown in the accompanying drawing as the "blue glass".

By varying the amount of iron in the example soda-lime-silica glass, transmittance characteristics can be altered. The following table reflects the changes caused by varying iron content:

| Glass No. | Pounds $Fe_2O_3$ added to Glass Batch | Percent Luminous Transmittance | Percent Total Solar Infrared Transmittance | Percent Total Solar Energy Transmittance |
|---|---|---|---|---|
| II | 2.5 | 74.1 | 10.9 | 39.8 |
| III | 2.0 | 75.5 | 13.6 | 42.1 |
| IV | 3.0 | 72.9 | 8.5 | 37.9 |
| V | 3.5 | 70.4 | 6.1 | 35.2 |

Glass numbers II to V were melted according to the preferred embodiment of the invention.

Glass number II is the blue glass shown in the accompanying drawing. The table shows how luminous transmittance decreases and heat absorption increases with increasing iron content.

The luminous transmittance is the summation of the percentage of the incident visible radiant energy (weighed by the energy distribution of the source and the eye's sensitivity) that will pass through the glass as described. In the invention, the source is illuminant "C", a standard source adopted by the International Commission on Illumination.

The total solar energy transmittance value as reported herein are calculated from the spectral transmittance of the glass and the spectral distribution of the solar radiant energy. The latter values are those of Parry Moon (*Journal of the Franklin Institute*, volume 230, November 1940).

The spectral transmittance measurements of the glasses of the present invention were made by standard spectrophotometric methods. A Beckman Quartz Spectrophotometer, Model DK-2A, is used for wavelengths between 300 and 2,300 millimicrons.

It should be appreciated, of course, that various size pots or crucibles can be employed in the practice of this invention, and the melting temperatures and times will vary according to the amount being formed. Also, the glass compositions used in practicing the method of this invention have viscosity versus temperature characteristics which are suitable for drawing into flat glass by modern plate, sheet and float glass mass production methods.

In the above examples, the total tin content of the glass samples was measured as $SnO_2$, although it should be realized that appreciable quantities of SnO are present in the glass. To determine the SnO content, a weighed glass sample is dissolved in a mixture of concentrated hydrofluoric and hydrochloric acids and a saturated boric acid solution. The solution is treated with potassium iodate which oxidizes the stannous ion to stannic. Based on the amount of potassium iodate needed, the stannous oxide content of the glass composition can be determined.

I claim:

1. A method of making a high infrared radiation absorbing, high visible light transmitting, soda-lime-silica flat glass article useful for motor vehicle windshields and architectural applications, comprising:
   a. preparing a glass batch composition by adding to a batch of soda-lime-silica glass making ingredients,
      i. 0.05 to 2.0 percent by weight iron measured as $Fe^0$; the iron being added in the form of metallic iron or compounds of ferrous or ferric ions to provide a ferrous-ferric equilibrium upon the melting of said glass batch composition,
      ii. 0.1 to 5 percent by weight tin measured as $Sn^0$; at least part of the tin being added in the form of metallic tin to provide stannous ions upon the melting of said glass batch composition;
   b. melting the glass batch composition to form a glass melt so that an internal reduction occurs to shift the normally occurring ferrous-ferric ion equilibrium to the ferrous state;
   c. forming a flat glass article from said glass melt in which at least 80 percent of the total iron in the glass is the ferrous state, and the mole ratio of stannous ions to ferrous ions is at least 1:1, the stannous ion serving as an internal reducing agent in the glass; and
   d. cooling said flat glass article.

2. The method of claim 1 in which a reducing gas is bubbled through the glass melt.

3. The method of claim 2 in which the reducing gas is hydrogen or natural gas.

4. The method of claim 1 in which an ingredient is added to the glass batch which upon melting releases a reducing gas in the glass melt.

5. The method of claim 4 in which the ingredient is ammonium chloride or oxalic acid.

6. The method of making a high infrared radiation absorbing, high visible light transmitting, soda-lime-silica flat glass article useful for motor vehicle windshields and architectural applications, comprising:
   a. preparing a glass batch composition by adding to a batch of soda-lime-silica glass making ingredients,
      i. 0.05 to 2.0 percent by weight iron measured as $Fe^0$; the iron being added in the form of metallic iron or compounds of ferrous or ferric ions to provide a ferrous-ferric equilibrium upon the melting of said glass batch composition,
      ii. 0.1 to 5 percent by weight tin measured as $Sn^0$; at least part of the tin being added in the form of compounds of stannous ions;
   b. melting the glass batch composition to form a glass melt so that an internal reduction occurs to shift the normally occurring ferrous-ferric ion equilibrium to the ferrous state.
   c. forming a flat glass article from said glass melt in which at least 80 percent of the total iron in the glass is in the ferrous state, and the mole ratio of stannous ions to ferrous ions is at least 1:1, the stannous ion serving as an internal reducing agent in the glass; and
   d. cooling said flat glass article.

7. The method of claim 6 in which a reducing gas is bubbled through the glass melt.

8. The method of claim 7 in which the reducing gas is hydrogen or natural gas.

9. The method of claim 6 in which an ingredient is added to the glass batch which upon melting releases a reducing gas in the glass melt.

10. The method of claim 9 in which the ingredient is ammonium chloride or oxalic acid.

11. The method of making a high infrared radiation absorbing, high visible light transmitting, soda-lime-silica flat glass article useful for motor vehicle windshields and architectural applications, comprising:
    a. preparing a glass batch composition by adding to a batch of soda-lime-silica glass making ingredients,
       i. 0.05 to 2.0 percent by weight iron measured as $Fe^0$; the iron being added in the form of metallic iron or compounds of ferrous or ferric ions to provide a ferrous-ferric equilibrium upon the melting of said glass batch composition,
       ii. 0.1 to 5 percent by weight tin measured as $Sn^0$; at least part of the tin being added in the form of compounds of stannic ions;
    b. melting the glass batch composition to form a glass melt;
    c. introducing a reducing agent into said glass melt to convert the stannic ions in said melt to stannous ions and to shift the normally occurring ferrous-ferric ion equilibrium to the ferrous state;
    d. forming a flat glass article from said glass melt in which at least 80 percent of the total iron in the glass is in the ferrous state, and the mole ratio of stannous ion to ferrous ion is at least 1:1, the stannous ions serving as an internal reducing agent in the glass; and
    e. cooling said flat glass article.

12. The method of claim 11 in which the reducing agent is a gas bubbled through the glass melt.

13. The method of claim 12 in which the reducing agent is hydrogen or natural gas.

14. The method of claim 11 in which an ingredient is added to the glass which upon melting releases a reducing gas in the glass melt.

15. The method of claim 14 in which the ingredient is ammonium chloride or oxalic acid.

* * * * *